US008280675B2

(12) United States Patent
Church et al.

(10) Patent No.: US 8,280,675 B2
(45) Date of Patent: Oct. 2, 2012

(54) SYSTEM AND METHOD FOR FILTERING TEMPERATURE PROFILES OF A WHEEL

(75) Inventors: Benjamin Paul Church, Blue Springs, MO (US); Donald Arndt, Napoleon, MO (US)

(73) Assignee: Progress Rail Services Corp, Albertville, AL (US)

( * ) Notice: Subject to any disclaimer, the term of this patent is extended or adjusted under 35 U.S.C. 154(b) by 414 days.

(21) Appl. No.: 12/535,057

(22) Filed: Aug. 4, 2009

(65) Prior Publication Data

US 2011/0035181 A1 Feb. 10, 2011

(51) Int. Cl.
*G01K 13/04* (2006.01)
*G01K 13/08* (2006.01)
*G01P 3/06* (2006.01)
*G01P 3/24* (2006.01)

(52) U.S. Cl. ......... 702/130; 702/136; 702/142; 702/148
(58) Field of Classification Search .............. 702/99, 702/130, 134, 135, 138, 184, 185; 246/169 D; 310/52; 340/463
See application file for complete search history.

(56) References Cited

U.S. PATENT DOCUMENTS

| | | | |
|---|---|---|---|
| 3,402,290 A | 9/1968 | Blackstone et al. |
| 3,629,572 A | 12/1971 | Gallagher |
| 3,646,343 A | 2/1972 | Caulier et al. |
| 3,697,744 A | 10/1972 | Howell |
| 3,731,087 A | 5/1973 | King |
| 3,812,343 A | 5/1974 | Gallagher et al. |
| 3,872,456 A | 3/1975 | Glazar |
| 4,068,811 A | 1/1978 | Caulier |
| 4,313,583 A | 2/1982 | Bambara et al. |
| 4,340,886 A | 7/1982 | Boldt et al. |
| 4,443,119 A | 4/1984 | Snider, Jr. et al. |
| 4,491,290 A | 1/1985 | Douglas |
| 4,501,006 A | 2/1985 | Korenberg |
| 4,659,043 A | 4/1987 | Gallagher |
| 4,805,854 A | 2/1989 | Howell |
| 4,928,910 A | 5/1990 | Utterback et al. |
| 4,974,797 A | 12/1990 | Myers et al. |
| 5,060,890 A | 10/1991 | Utterback et al. |
| 5,100,243 A | 3/1992 | Grosskopf et al. |
| 5,149,025 A | 9/1992 | Utterback et al. |

(Continued)

FOREIGN PATENT DOCUMENTS

DE 4325018 3/1994

(Continued)

OTHER PUBLICATIONS

PCT/US2008/060521; filed Apr. 16, 2008; International Search Report; 4 pgs.

(Continued)

*Primary Examiner* — Mohamed Charioui
*Assistant Examiner* — Felix Suarez (57) ABSTRACT

A method for inspecting a rail vehicle includes receiving signals representative of temperatures of a wheel of the rail vehicle and generating a sensed wheel temperature profile of the wheel based on the signals. At least a portion of the sensed wheel temperature profile is representative of the temperatures of the wheel. The method also includes identifying waveform attributes in the sensed wheel temperature profile and designating the sensed wheel temperature profile as at least one of a typical wheel profile and an atypical wheel profile based on the waveform attributes in the sensed wheel temperature profile.

23 Claims, 6 Drawing Sheets

U.S. PATENT DOCUMENTS

| | | | |
|---|---|---|---|
| 5,201,483 | A | 4/1993 | Sutnar et al. |
| 5,331,311 | A * | 7/1994 | Doctor .................... 340/463 |
| 5,381,700 | A | 1/1995 | Grosskopf, Jr. |
| 5,429,329 | A | 7/1995 | Swanson |
| 5,446,451 | A | 8/1995 | Grosskopf, Jr. |
| 5,446,452 | A | 8/1995 | Litton |
| 5,448,072 | A | 9/1995 | Gallagher |
| 5,659,491 | A | 8/1997 | Ichikawa et al. |
| 5,660,470 | A | 8/1997 | Mench |
| 5,677,533 | A | 10/1997 | Yaktine et al. |
| 5,734,579 | A | 3/1998 | Sakaguchi |
| 6,100,964 | A | 8/2000 | De Cremiers |
| 6,241,196 | B1 | 6/2001 | Steurer et al. |
| 6,405,148 | B1 | 6/2002 | Hayashi et al. |
| 6,523,411 | B1 | 2/2003 | Mian et al. |
| 6,663,053 | B1 | 12/2003 | Shams |
| 6,688,561 | B2 | 2/2004 | Mollet et al. |
| 6,695,472 | B1 | 2/2004 | Nayer |
| 6,813,581 | B1 | 11/2004 | Snyder |
| 6,826,489 | B2 | 11/2004 | Scanlan et al. |
| 6,872,945 | B2 | 3/2005 | Bartonek |
| 6,881,951 | B2 | 4/2005 | Bartonek |
| 6,911,914 | B2 | 6/2005 | Mathews, Jr. et al. |
| 7,024,294 | B2 | 4/2006 | Sullivan et al. |
| 7,026,609 | B2 | 4/2006 | Bartonek |
| 7,139,668 | B2 | 11/2006 | Bechhoefer |
| 7,140,577 | B2 | 11/2006 | Mollet et al. |
| 7,415,771 | B2 | 8/2008 | Harrill |
| 7,769,564 | B2 * | 8/2010 | Church .................... 702/184 |
| 2002/0139191 | A1 | 10/2002 | Hedeen et al. |
| 2003/0006655 | A1 * | 1/2003 | Zhang .................... 310/52 |
| 2003/0188579 | A1 | 10/2003 | Evans et al. |
| 2003/0236598 | A1 | 12/2003 | Villarreal Antelo et al. |
| 2004/0058432 | A1 | 3/2004 | Owen et al. |
| 2005/0194497 | A1 | 9/2005 | Matzan |
| 2005/0203697 | A1 | 9/2005 | Dalgleish |
| 2006/0131464 | A1 * | 6/2006 | Hesser et al. .......... 246/169 D |
| 2008/0228427 | A1 | 9/2008 | Church |
| 2008/0281532 | A1 | 11/2008 | Church et al. |
| 2008/0288170 | A1 | 11/2008 | Ruggiero |

FOREIGN PATENT DOCUMENTS

| | | |
|---|---|---|
| DE | 4238151 | 5/1994 |

OTHER PUBLICATIONS

PCT/US2008/061897; Filed Apr. 29, 2008; International Search Report; 4 pgs.

PCT/US2007/086748; Filed Dec. 7, 2007; International Search Report; 4 pgs.

Knoll, et al., "Entwicklung Eines Checkpointprototypen bei der OEBB Infrastruktur Betrieb AG"; Signal + Draht; Telzlaff Verlag GmbH, Darmstadt, DE; Jul. 1, 2006, pp. 10-14; XP001244502, ISSN 0037-4997.

Wolfberg, et al., "Der Fracas-Prozess—Felddatenerfassung und Verfuegbarkeitsoptimierung"; Signal + Draht; Telzlaff Verlag GmbH, Darmstadt, DE; vol. 93, No. 10, Oct. 2001, pp. 25-29, XP001082215, ISSN 0037-4997.

* cited by examiner

SYSTEM AND METHOD FOR FILTERING TEMPERATURE PROFILES OF A WHEEL

BACKGROUND OF THE INVENTION

The subject matter described and/or illustrated herein relates generally to vehicle inspection systems.

Known rail vehicle inspection systems include hot box detectors that measure the temperature of one or more components of rail vehicles. For example, some known inspection systems include infrared scanners that monitor infrared radiation emanating from wheels of the rail vehicles to determine if the wheels exhibit abnormally elevated temperatures. The infrared scanners scan across the wheels as the rail vehicle moves past the infrared scanners. If the infrared scanners detect an elevated temperature of the wheels, the inspection system may activate an alarm to notify operators of the inspection system and/or the rail vehicle. The elevated wheel temperatures may be caused by a brake that is stuck in an engaged position against a wheel. For example, in general, most of the wheels of a rail vehicle rotate along a track as the rail vehicle moves along the track. But, if a brake is stuck in an engaged position against a wheel, the wheel may not rotate or may rotate at a slower speed than the other wheels of the rail vehicle. These types of wheels may be referred to as "stuck wheels." Friction between the stuck wheels and the rail may heat up the stuck wheels. The wheels may fail if the wheels heat up too much.

Some known infrared scanners generate signals that are representative of the temperatures sensed by the scanners. These signals may be inaccurate representations of the sensed temperatures of a wheel or other component of a rail vehicle. For example, conditions such as electrical noise in the inspection system, microphonic noise caused by flat portions of wheels and/or the rail vehicle moving relative to the scanners, sunshots impacting the radiation sensed by the scanners, misalignment of the scanners relative to the wheels, and the like, may cause the signals to inaccurately represent temperatures of a wheel. In some situations, the signals may indicate that a hot box is detected when the wheel does not actually have an elevated temperature. Such inaccurate signals may result in false alarms of hot boxes.

Thus, a need exists for a system and method of inspecting the temperatures of wheels in a rail vehicle that filters out signals that may not be representative of the temperatures of the wheels.

BRIEF DESCRIPTION OF THE INVENTION

In one embodiment, a method for inspecting a rail vehicle is provided. The method includes receiving signals representative of temperatures of a wheel of the rail vehicle and generating a sensed wheel temperature profile of the wheel based on the signals. At least a portion of the sensed wheel temperature profile is representative of the temperatures of the wheel. The method also includes identifying waveform attributes in the sensed wheel temperature profile and designating the sensed wheel temperature profile as at least one of a typical wheel profile and an atypical temperature profile based on the waveform attributes in the sensed wheel temperature profile.

In another embodiment, a rail vehicle inspection system is provided. The system includes a temperature sensor and a processor. The sensor is configured to sense temperatures of a wheel of a rail vehicle and to generate signals that are representative of the temperatures. The processor receives the signals from the temperature sensor. The processor also is programmed to generate a sensed wheel temperature profile based on a portion of the signals. At least a portion of the sensed wheel temperature profile is representative of the temperatures of the wheel. The processor is further programmed to identify waveform attributes in the sensed wheel temperature profile. The processor designates the sensed wheel temperature profile as at least one of a typical wheel profile and an atypical wheel profile based on the waveform attributes.

In another embodiment, a computer readable storage medium for a rail inspection system is provided. The system includes a processor and a temperature sensor that is configured to sense temperatures of a wheel of a rail vehicle and to generate signals representative of the temperatures. The computer readable storage medium includes instructions to direct the processor to receive the signals from the temperature sensor and generate a sensed wheel temperature profile based on the signals. The sensed wheel temperature profile is representative of the temperatures of the wheel. The instructions also direct the processor to identify waveform attributes in the sensed wheel temperature profile and to designate the sensed wheel temperature profile as at least one of a typical wheel profile and an atypical wheel profile based on the waveform attributes.

DETAILED DESCRIPTION OF THE INVENTION

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It should be noted that although one or more embodiments may be described in connection with rail vehicle inspection systems, the embodiments described herein are not limited to trains. In particular, one or more embodiments may be implemented in connection with different types of rail vehicles (e.g., a vehicle that travels on one or more rails, such as single locomotives and railcars, powered and un-powered ore carts and other mining vehicles, light rail transit vehicles, and the like) and other vehicles. Example embodiments of systems and methods for filtering temperature profiles of a wheel of a rail vehicle are provided. At least one technical effect described herein includes a method and system that filters out atypical wheel profiles from determination of whether a wheel of a rail vehicle has an elevated temperature in order to prevent false alarms or reduce the number or frequency at which false alarms associated with false elevated wheel temperature readings occur.

Figure 1:
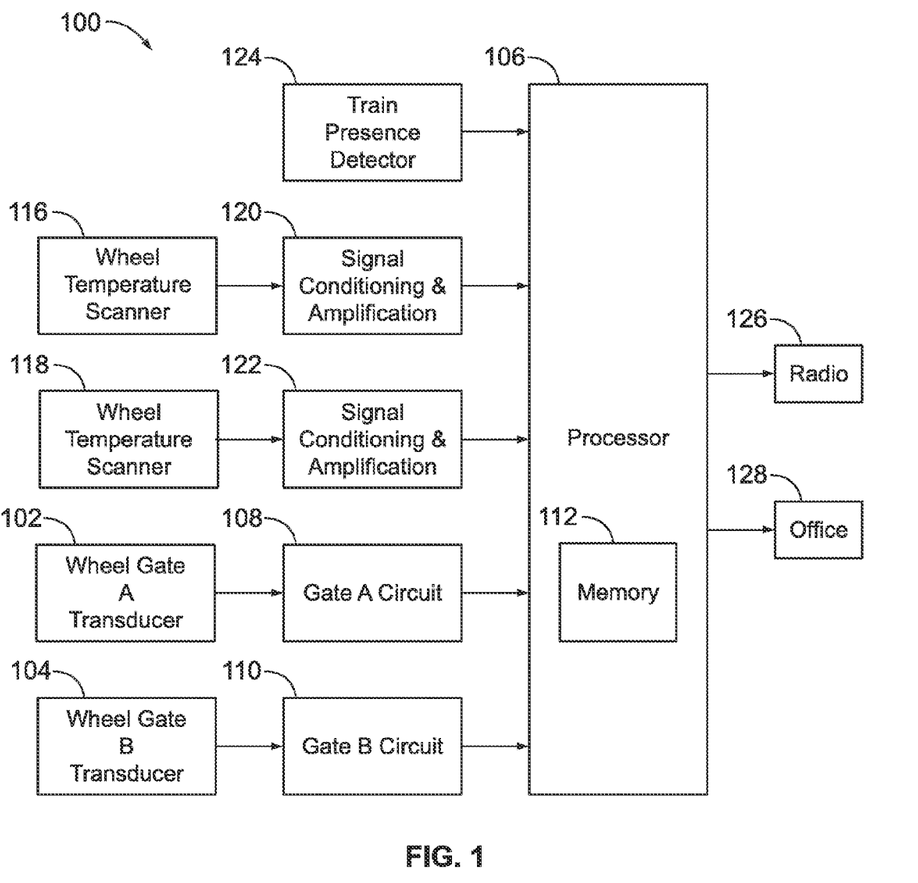
FIG. 1 is a schematic illustration of a rail vehicle inspection system in accordance with one embodiment.

FIG. 1 is a schematic illustration of a rail vehicle inspection system 100 in accordance with one embodiment. The system 100 inspects rail vehicles 200 (shown in FIG. 2) as the rail vehicles 200 pass the system 100 on one or more rails 202 (shown in FIG. 2). The system 100 includes a wheel "Gate A" transducer 102 and a wheel "Gate B" transducer 104. The transducers 102, 104 are joined to the rail 202 and are coupled with a processor 106 through corresponding Gate A and Gate B circuits 108, 110. The Gate A transducer 102 is longitudinally spaced apart from the Gate B transducer 104 along the rail 202. An inspection window or heat detection window may be defined as the space along the rail 202 between the transducers 102, 104. The transducers 102, 104 detect when a wheel 204 (shown in FIG. 2) of the rail vehicle 200 enters and exits into the inspection window from either direction along the rail 202. Based on this information, the Gate A, B circuits 108, 110 and/or the processor 106 may direct one or more devices to examine the wheels or bearings. For example, temperature sensors such as wheel temperature scanners 116, 118 may scan the wheels 204 of the rail vehicle 200 to determine if the wheel 204 is overheated.

The system 100 may include signal conditioning and amplification units 120, 122 that are coupled to and receive signals from the wheel temperature scanners 116, 118. The units 120, 122 condition and amplify the voltage component of the signal transmitted from the bearing scanners 116, 118. The analog signals generated by the units 120, 122 are transmitted to the processor 106. The system 100 also includes a rail vehicle presence detector 124 that determines when the rail vehicle 200 (shown in FIG. 2) is approaching the system 100. The processor 106 may energize or de-energize one or more components of the system 100 based upon the state of the rail vehicle presence detector 124. The system 100 transmits information generated by the processor 106 to a radio 126 and/or a remote office 128. For example, a warning indication may be transmitted to the radio 126 in order to audibly announce an overheated wheel.

The processor 106 includes one or more computer processors, microprocessors, microcontrollers, software instructions and/or modules, circuits, and the like, for fetching, interpreting, and/or executing instructions that are stored in a memory 112. The memory 112 may be one or more local or remote memories, whether volatile or nonvolatile. One or more sets of instructions for the processor 106 are stored in the memory 112. For example, the memory 112 may include a computer readable storage medium that includes software or software modules for directing the processor 106 to perform certain operations. Additionally, one or more thresholds that are described below may be stored on the memory 112. The memory 112 may be embodied in a variety of computer readable media, including, by way of example only, an electrically erasable programmable read only memory (EEPROM), a simple read only memory (ROM), programmable read only memory (PROM), and erasable programmable read only memory (EPROM).

Figure 2:
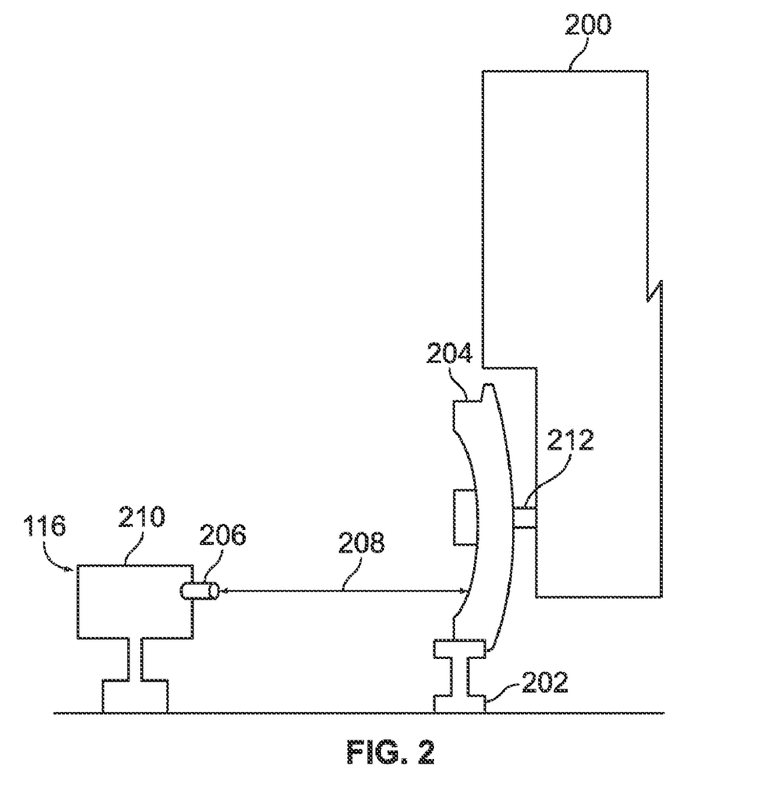
FIG. 2 is a schematic illustration of a wheel temperature scanner shown in FIG. 1 in accordance with one embodiment.

FIG. 2 is a schematic illustration of the wheel temperature scanner 116 alongside the rail vehicle 200 on the rail 202 in accordance with one embodiment. While only the wheel temperature scanner 116 is shown in FIG. 2, the description that follows may apply to the wheel temperature scanner 118 (shown in FIG. 1). The wheel temperature scanner 116 may be located at or proximate to the rail 202 to permit the wheel temperature scanner 116 to sense temperatures of the wheel 204. For example, the wheel temperature scanner 116 may be located within a few feet of the rail 202. In one embodiment, the wheel temperature scanner 116 is located near the rail 202 on one side of the tracks while the wheel temperature scanner 118 is located near another rail (not shown) on another side of the tracks. The wheel temperature scanner 116 may sense temperatures of the wheels 204 on one side of the rail vehicle 200 while the wheel temperature scanner 118 senses temperatures of the wheels 204 on the other side of the rail vehicle 200. For example, wheels 204 on opposite sides of the rail vehicle 200 may be interconnected with one another by an axle 212. The wheel temperature scanner 116 may sense temperatures of the wheel 204 on one end of the axle 212 while the wheel temperature scanner 118 senses temperatures of the wheel 204 on the opposite end of the axle 212. Each wheel temperature scanner 116 may obtain several samples of the temperatures of the wheel 204 passing by the wheel temperature scanner 116 from a single point. For example, the wheel temperature scanner 116 may sense the temperatures from a single location or point along a sensing path 208 as the wheel 204 passes the location or point. While the wheel temperature scanner 116 is illustrated in FIG. 2 as being positioned away from the rail 202 and sensing temperatures along a horizontal sensing path 208, alternatively the wheel temperature scanner 116 may be mounted to or near the rail 202 and sense temperatures along a sensing path 208 that is angled upward toward the wheel 204.

In one embodiment, the wheel temperature scanners 116, 118 (shown in FIG. 1) are infrared (IR) temperature scanners. Each of the wheel temperature scanners 116, 118 may include a lens 206 for receiving infrared radiation emanating from the wheels 204 along the sensing path 208 as the wheel 204 passes by the corresponding wheel temperature scanners 116, 118. As shown in FIG. 2, the sensing path 208 may be transversely oriented with respect to the rail 202. A housing 210 of the wheel temperature scanners 116, 118 encloses a pyroelectric cell (not shown) or other suitable infrared sensing unit or sensor. The infrared sensing units in each of the wheel temperature scanners 116, 118 may convert the IR radiation that is received from a wheel 204 as the wheel 204 passes by the respective wheel temperature scanner 116, 118 to an analog electrical voltage signal. The analog electrical voltage signal may have a magnitude that is directly or indirectly proportional to the IR radiation of the passing wheels 204. The analog electrical voltage signals may be communicated to the signal conditioning and amplification units 120, 122 (shown in FIG. 1) and then to the processor 106 (shown in FIG. 1) for analysis. The signals that are communicated to the processor 106 are representative of temperatures of the wheels 204 that pass by the wheel temperature scanners 116, 118.

Figure 3:
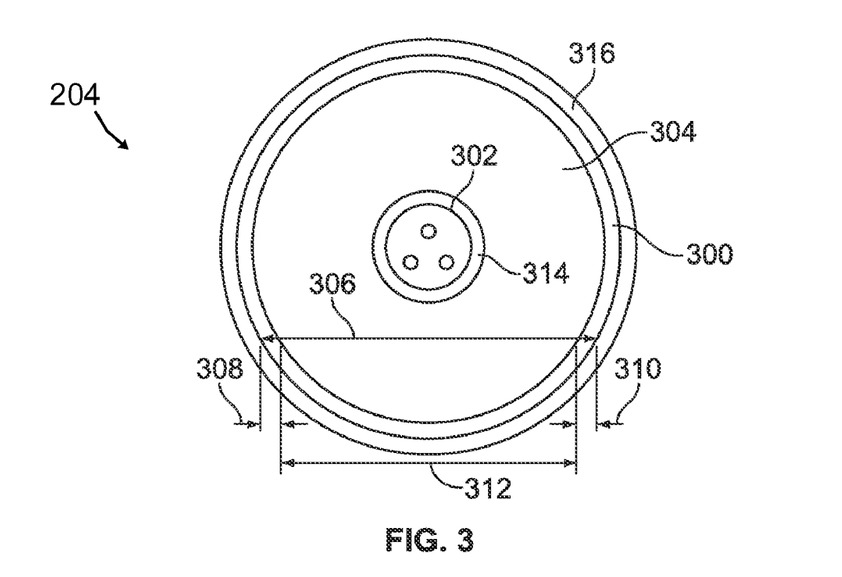
FIG. 3 is an elevational view of a wheel shown in FIG. 2 in accordance with one embodiment.

FIG. 3 is an elevational view of the wheel 204 in accordance with one embodiment. The wheel 204 surrounds an axle journal 302. The axle journal 302 couples the wheel 204 to the axle 212 (shown in FIG. 2). Typically, wheels 204 consist of a hub 314, a plate 304, a rim 300, and a flange 316. The axle journal 302 may be circumferentially surrounded by the hub 314. As shown in FIG. 2, the wheel temperature scanners 116, 118 (shown in FIG. 1) may sample IR radiation from the wheels 204 in a location between the axle journal 302 and the rim 300. For example, each of the wheel temperature scanners 116, 118 may sense IR radiation, and therefore temperature of the wheels 204, at a sampling point or location as the wheel 204 passes through the sampling point or location. The sampling point or location may define a sampling plane 306 across the wheel 204 as the wheel 204 passes the sampling point or location. For example, the sampling point may define a flat sampling plane 306 as the wheel 204 passes the wheel temperature scanner 116. The wheel temperature scanners 116, 118 periodically sample the temperatures of the wheel 204 for various locations on the wheel 204 that pass through the sampling plane 306 as the wheel 204 passes by the corresponding wheel temperature scanner 116, 118. In a scenario where the wheel 204 is not rotating relative to the wheel temperature scanner 116, 118 that is sampling temperatures of the wheel 204, the wheel temperature scanner 116, 118 may sense temperatures of the wheel 204 along a substantially linear path across the wheel 204 that is approximately coextensive with the sampling plane 206. For example, if the wheel 204 is not rotating due to a brake that is stuck in an engaged position against the wheel 204, the wheel temperature scanner 116 may sample temperatures along a linear path that is defined by the intersection of the sampling plane 306 and the wheel 204. In a scenario where the wheel 204 is rotating relative to the wheel temperature scanner 116, 118 that is sampling temperatures of the wheel 204, the wheel temperature scanner 116, 118 may sense temperatures of the wheel 204 along an arcuate or spiral path across the wheel 204. For example, if the brake associated with the wheel 204 is not stuck in an engaged position and permits the wheel 204 to rotate relative to the wheel temperature scanner 116, then the point or location at which the wheel temperature scanner 116 is sampling temperatures of the wheel 204 may extend over a path shaped as an arc or spiral across the wheel 204.

The sampling plane 306 includes opposite end segments 308, 310 and a middle segment 312. The location of the sampling plane 306 in the illustrated embodiment is provided merely as an example. The path over which IR radiation, and therefore temperatures, of the wheel 204 is sensed by the wheel temperature scanners 116, 118 may be located elsewhere on the wheel 204.

Figure 4:
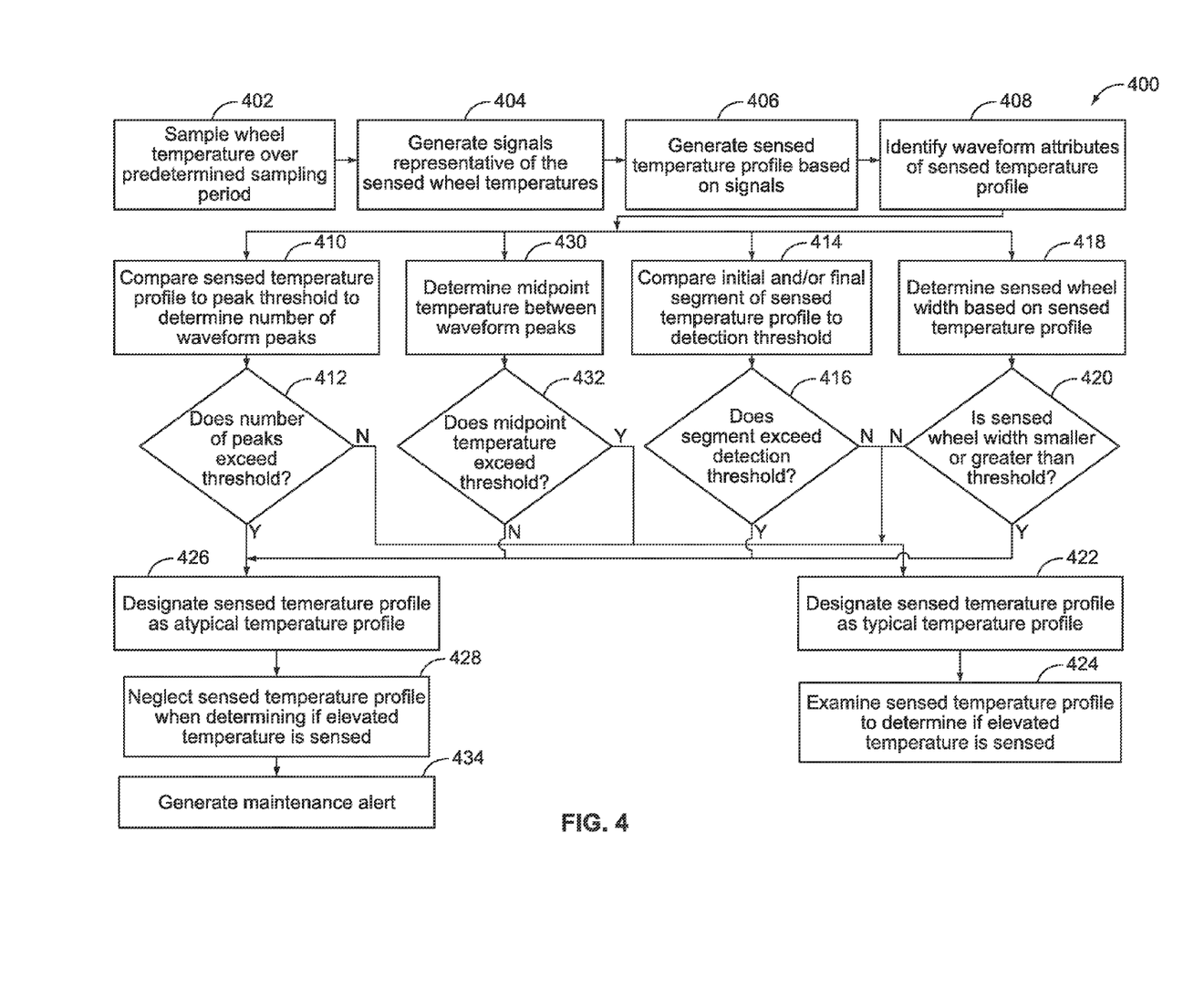
FIG. 4 is a flowchart of a method for inspecting a rail vehicle shown in FIG. 2 in accordance with one embodiment.

FIG. 4 is a flowchart of a method 400 for inspecting the rail vehicle 200 (shown in FIG. 2) in accordance with one embodiment. One or more of the operations described in connection with the method 400 may be performed by the processor 106 (shown in FIG. 1) and/or the wheel temperature scanner 116 and/or 118 (shown in FIG. 1). While some of the operations of the method 400 are described below as being performed by the wheel temperature scanner 116, the operations also may be performed by the wheel temperature scanner 118 for a different wheel 204 of the rail vehicle 200.

At 402, temperatures of the wheel 204 (shown in FIG. 2) are sampled over a predetermined sampling period. The sampling period may include a time period or window that is sufficiently long in duration to obtain multiple samples of the wheel temperatures for a single wheel 204 but short enough to avoid obtaining samples of wheel temperatures for a different, subsequent wheel. For example, the wheel temperature scanner 116 (shown in FIG. 1) may begin sampling when the wheel 204 is detected by the wheel gate A transducer 102 (shown in FIG. 1). The sampling period 530 may end before a subsequent wheel in the rail vehicle 200 (shown in FIG. 2) passes the sensing path 208 (shown in FIG. 2) of the wheel temperature scanner 116. The processor 106 may sample the wheel temperature scanner 116 to collect a representation of the IR radiation emanating from the wheel 204 along the sensing path 208 during the sampling period. In one embodiment, the sampling period 530 includes samples of the IR radiation along the sensing path 208 before and/or after the wheel 204. For example, the processor 106 may sample the wheel temperature scanner prior to the wheel 204 crossing the sensing path 208 and/or after the wheel 204 passes the sensing path 208.

In one embodiment, the wheel temperature scanner 116 (shown in FIG. 1) samples the wheel temperatures at a rate or frequency that is scaled to the speed at which the rail vehicle 200 (shown in FIG. 2) is moving through the inspection window. The sampling rate may be dynamically adjusted by the processor 106 based upon the speed of the rail vehicle 200. The speed of the rail vehicle 200 may be calculated based upon a known distance between the wheel gate A and B transducers 102, 104 and the signals provided by the Gate A and B Circuits 108, 110. For example, the processor 106 may increase the frequency at which the processor 106 samples the wheel temperature scanners 116 as the speed of the rail vehicle 200 increases. Conversely, the processor 106 may decrease the sampling frequency as the speed of the rail vehicle 200 decreases. In one embodiment, the processor 106 samples the wheel temperatures at a frequency that provides a temperature sample for each linear inch of wheel travel. For example, if the wheel gate transducers 102, 104 are spaced 24-inches apart, the processor 106 adjust the rate at which it samples the wheel temperature scanner 116 to insure that it collects 24 samples as the wheel passes from the A transducer to the B transducer. These samples are exemplary of a wheel temperature profile 500.

At 404, the wheel temperature scanner 116 (shown in FIG. 1) generates signals that are representative of the sensed wheel temperatures. For example, the wheel temperature scanner 116 may create analog and/or digital signals that represent the wheel temperatures that were sensed during the sampling period at 402. The signals are sampled by the processor 106 (shown in FIG. 1).

At 406, a sensed wheel temperature profile is generated. The sensed wheel temperature profile is generated based on the signals generated by the wheel temperature scanner 116 (shown in FIG. 1). For example, the sensed wheel temperature profile may be a representation of the wheel temperatures that were measured for a single wheel 204 of the rail vehicle 200 (shown in FIG. 2), the profile comprising, therefore, for the single wheel 204, a plurality of sensed temperatures of the wheel 204. In one embodiment, the sensed wheel temperature profile includes multiple temperature samples of a single wheel 204, in contrast to a profile that includes a single temperature sample for each of several wheels 204.

Figure 5:
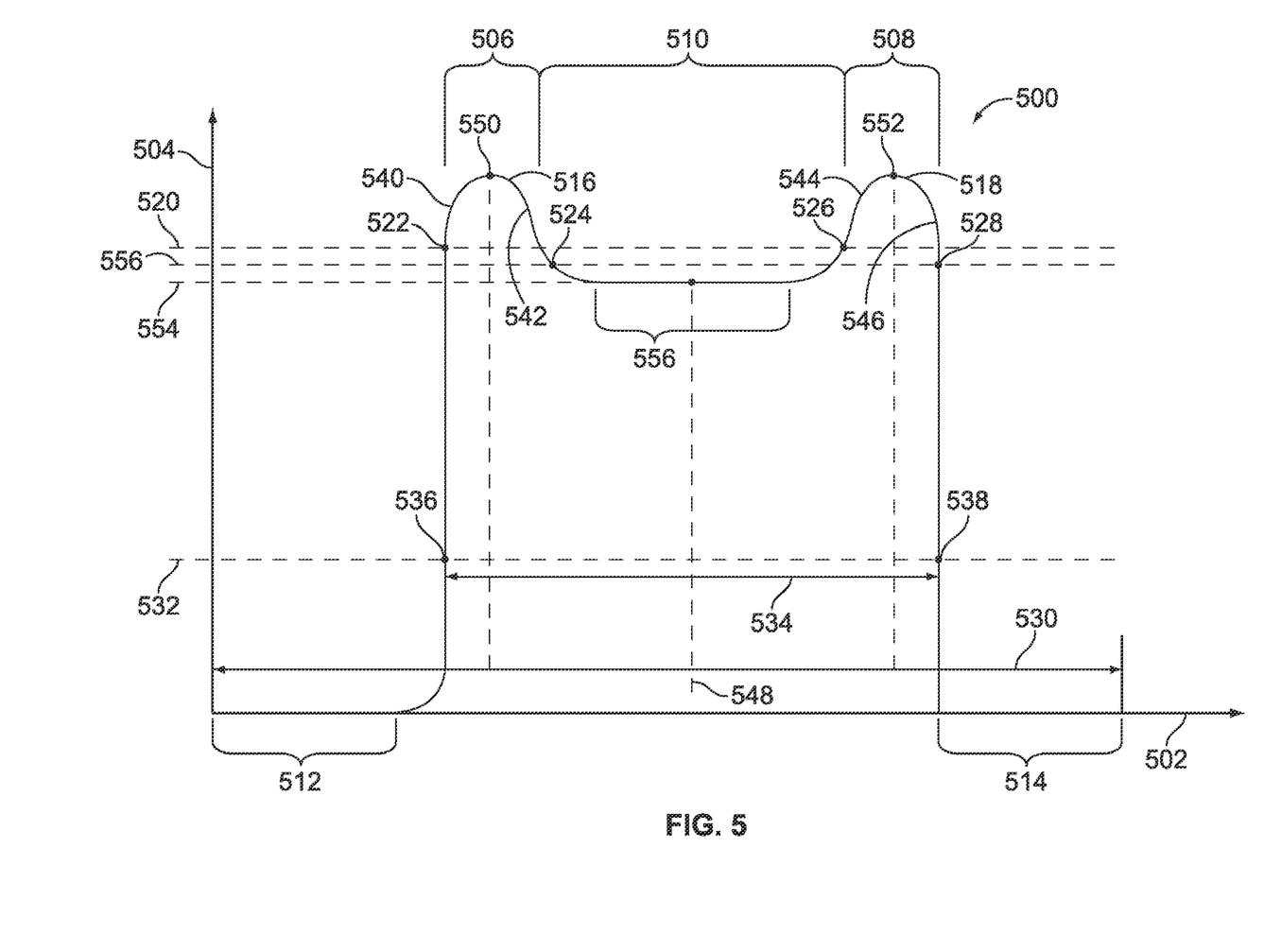
FIG. 5 is an example of a sensed wheel temperature profile.

FIG. 5 is an example of a sensed wheel temperature profile 500. The sensed wheel temperature profile 500 is shown alongside a horizontal axis 502 that is representative of distance and/or time and a vertical axis 504 that is representative of temperature. A sampling period 530 represents the time and/or distance over which the wheel temperatures are sampled for the wheel 204. The sensed wheel temperature profile 500 is shown as a waveform that represents the sensed wheel temperature at various positions outside and across the wheel 204. For example, the sensed wheel temperature profile 500 may represent temperatures that are sensed before the wheel 204 passes the wheel temperature scanner 116 (shown in FIG. 1), temperatures that are sensed along the sampling plane 306 of the wheel 204 as the wheel 204 passes the wheel temperature scanner 116, whether the wheel 204 is rotating or not, and temperatures that are sensed after the wheel 204 passes the wheel temperature scanner 116. With respect to the sampling plane 306, a leading temperature region 506 and a trailing temperature region 508 in the profile 500 may represent the wheel temperatures that were sensed in the region of the leading rim 308 and trailing rim 310 (shown in FIG. 3) of the wheel 204 while middle temperature region 510 represents the wheel temperatures that were sensed on the plate 312 (shown in FIG. 3)

The sensed wheel temperature profile 500 is preceded by an initial section 512 and is followed by a final section 514. The initial and final sections 512, 514 represent the temperatures that are sensed by wheel temperature scanner 116 (shown in FIG. 1) outside of the sampling plane 306 (shown in FIG. 3) of the wheel 204 (shown in FIG. 2). For example, the initial section 512 may represent the temperatures that were sampled by the wheel temperature scanner 116 prior to the wheel 204 entering into the sensing path 208 (shown in FIG. 2) of the wheel temperature scanner 116 while the final section 514 represents the temperatures that were sensed after the wheel 204 passed the sensing path 208. In one embodiment, the initial section 512 may include a predetermined number of samples of the wheel temperatures that are sensed by the wheel temperature scanner 116 at the beginning of the sampling period 530 while the final section 514 includes a predetermined number of samples of the wheel temperatures that are obtained at the tail end of the sampling period 530.

A predetermined and/or configurable detection threshold 532 may be a threshold that filters out noise in the system 100 (shown in FIG. 1). The sensed wheel temperature profile 500 may be compared to the detection threshold 532 in order to avoid considering or treating noise in the signals represented by the sensed temperature as actual wheel temperature measurements. Signals that exceed the detection threshold 532 may be treated by the processor 106 (shown in FIG. 1) as being representative of wheel temperatures while signals that fall below the detection threshold 532 may be treated as noise.

Returning to the discussion of the method 400 in FIG. 4, at 408, one or more waveform attributes of the sensed wheel temperature profile are identified. By way of example only, the waveform attributes may include one or more characteristics shapes, values, slopes, temperatures, and the like, of the sensed wheel temperature profile. The processor 106 (shown in FIG. 1) may analyze the sensed wheel temperature profile to identify and/or count the number of waveform attributes that are found in the sensed wheel temperature profile. The processor 106 may compare one or more waveform attributes to one or more predetermined thresholds. Flow of the method 400 may vary based on which of several example waveform attributes are searched for in and/or analyzed from the sensed wheel temperature profile. By way of example only, the method 400 may search for waveform peaks in the sensed wheel temperature profile, compare one or more wheel temperatures represented by the sensed wheel temperature profile, search for initial and/or final segments in the sensed wheel temperature profile that exceed a detection threshold, and/or examine a wheel chord width that is derived from the sensed wheel temperature profile. Several embodiments are described below that include examples of waveform attributes that are examined to determine if a sensed wheel temperature profile is a typical or atypical wheel profile. Two or more of the examples described hereinafter may be used in conjunction to make this determination. Alternatively, only a single one of the examples is used.

In one embodiment, at 410, the sensed wheel temperature profile is examined to determine if one or more waveform peaks are present in the sensed wheel temperature profile. For example, the waveform attributes that are identified may include one or more waveform peaks of the sensed wheel temperature profile. A waveform peak may be a portion of the sensed wheel temperature profile that increases above a rising edge threshold and then falls below the falling edge threshold during sampling period for a single wheel 204 (shown in FIG. 2). Optionally, a waveform peak is identified when both an increase of a sensed wheel temperature profile above a rising edge threshold and a decrease of the sensed wheel temperature profile below the falling edge threshold occur within a predetermined and/or configurable time period or subset of the sampling period. With respect to the sensed wheel temperature profile 500 (shown in FIG. 5), two waveform peaks 516, 518 may be identified as waveform attributes. The first waveform peak 516 follows a rising edge 540 of the sensed wheel temperature profile 500 that increases above a rising edge peak threshold 520 at an increase point 522 and is located prior to a falling edge 542 of the profile 500 that falls below a falling edge peak threshold 556 at a decrease point 524. The second waveform peak 518 follows another rising edge 544 of the profile 500 that increases above the rising edge peak threshold 520 at an increase point 526 and is located prior to another falling edge 546 of the profile 500 that decreases below the falling edge peak threshold 556 at a decrease point 528. The rising edge and/or falling edge peak thresholds 520, 556 may be predefined and/or configurable by an operator of the system 100 (shown in FIG. 1). In the illustrated embodiment, the rising edge peak threshold 520 is greater than the falling edge peak threshold 556. Alternatively, the rising and falling edge peak thresholds 520, 556 may be the same or the rising edge peak threshold 520 may be smaller than the falling edge peak threshold 556.

Returning to the discussion of the method 400 in FIG. 4, at 412, the identified waveform attributes are compared to a predetermined threshold. The number of waveform peaks 516, 518 may indicate whether the signals used to generate the sensed wheel temperature profile 500 (shown in FIG. 5) are representative of the temperature profile of the wheel 204 (shown in FIG. 2). In one embodiment, the number of waveform peaks 516, 518 (shown in FIG. 5) is compared to a predetermined and/or configurable threshold. The threshold number of waveform peaks may be two. For example, the rim 300 (shown in FIG. 3) of the wheel 204 typically is at a greater temperature than the plate 304 (shown in FIG. 3) because brakes on the rail vehicle 200 may frictionally engage the rim 300 and thereby increase the temperature of the rim 300 to slow the rail vehicle 200. As the wheel temperature scanner 116 senses IR radiation along the sampling plane 306 (shown in FIG. 3) and the sampling plane 306 spans across the rim 300 on both sides of the wheel 204, a sensed wheel temperature profile may be representative of temperatures of the wheel 204 when the profile includes two waveform peaks that correspond to the temperatures of the rim 300. With respect to the sensed wheel temperature profile 500, the two waveform peaks 516, 518 indicate that the sensed wheel temperature profile 500 represents the wheel temperatures of the wheel 204. As a result, flow of the method 400 proceeds to 422.

At 422, the sensed wheel temperature profile 500 (shown in FIG. 5) is designated as a typical wheel profile. A typical wheel profile is a sensed wheel temperature profile that is representative of the temperatures of the wheel 204 (shown in FIG. 2) as opposed to a sensed wheel temperature profile that is not representative of wheel temperatures. For example, the sensed temperature waveform 500 may be a typical wheel profile because the sensed temperature waveform 500 includes two waveform peaks 516, 518 (shown in FIG. 5) with a valley disposed between the waveform peaks 516, 518. As described above, the two waveform peaks 516, 518 may represent the temperatures of the rim 300 (shown in FIG. 3) while the valley, or the portion of the sensed wheel temperature profile 500 between the waveform peaks 516, 518, may represent the temperatures of the plate 304 (shown in FIG. 3).

At 424, the sensed wheel temperature profile 500 (shown in FIG. 5) is examined to determine if the wheel temperatures represent an elevated temperature above an alarm threshold. The alarm threshold is a predetermined and/or configurable temperature threshold that may be compared to typical wheel profiles in order to determine whether the wheel temperatures indicate that a brake is stuck in an engaged position against the wheel 204 (shown in FIG. 2). For example, the alarm threshold may be a threshold similar to the rising and/or falling edge peak thresholds 520, 556 (shown in FIG. 5). If the sensed wheel temperature profile 500 exceeds the alarm threshold, the sensed wheel temperature profile 500 may indicate that the wheel 204 is overheating due to a brake that is stuck against the wheel 204. As a result, an alarm may be activated to warn operators of the system 100 (shown in FIG. 1) of the potentially overheated wheel 204.

In another embodiment, the method 400 proceeds from 408 to 430. At 430, a midpoint temperature attribute is determined. The midpoint temperature attribute is representative of a temperature in the sensed wheel temperature profile that is located between waveform peaks. For example, with respect to the sensed wheel temperature profile 500 shown in FIG. 5, at 430, the waveform peaks 516, 518 are identified and a midpoint location 548 between the waveform peaks 516, 518 is determined. The peaks 516, 518 may be identified as described above. The midpoint location 548 may be identified by determining a maximum point 550, 552 of each peak 516, 518 and calculating the midpoint along the horizontal axis 502 between the maximum points 550, 552. Alternatively, the midpoint location 548 may be offset from the exact middle location between the peaks 516, 518. The maximum points 550, 552 may be the greatest temperatures associated with each respective peak 516, 518. In the illustrated embodiment, the midpoint location 548 is midway between two adjacent waveform peaks 516, 518. Alternatively, the midpoint location 548 may be between two non-adjacent waveform peaks. In another embodiment, the first rising edge point 522 and the last falling edge point 528 may be used for calculating the midpoint 548. Once the midpoint location 548 is determined, a midpoint temperature 554 that is associated with the midpoint location 548 is obtained. The midpoint temperature 554 is the temperature represented by the sensed wheel temperature profile 500 that corresponds to the midpoint location 548.

Returning to the discussion of the method 400 in FIG. 4 and with continued reference to FIG. 5, at 432, the midpoint temperature attribute is compared to a predetermined midpoint temperature threshold. For example, the midpoint temperature attribute 554 may be compared to the, predetermined midpoint temperature threshold. The predetermined midpoint temperature threshold may be a customizable threshold that is stored in a computer-readable memory. If the midpoint temperature attribute does not exceed the midpoint temperature threshold, then the midpoint temperature attribute may indicate that the sensed wheel temperature profile 500 is not representative of the temperatures of the wheel 204 (shown in FIG. 2). For example, in a situation where the wheel 204 is heated along the outer perimeter or rim 300 (shown in FIG. 3) of the wheel 204, a sensed wheel temperature profile that represents the wheel temperatures may include two temperature peaks separated by a decreasing valley. As shown in FIG. 5, the sensed wheel temperature profile 500 includes two waveform peaks 516, 518 that are separated by a valley 556 located in the middle temperature region 510. The waveform peaks 516, 518 may correspond to the elevated temperatures of the rim 300 where the brake engages the wheel 204 while the valley 556 represents the temperatures of the plate 304 (shown in FIG. 3) of the wheel 204. The midpoint temperature 554 may be associated with a sensed wheel temperature that is sensed from the plate 304 of the wheel 204. If the midpoint temperature 554 is too low, then the sensed temperature profile 500 may not be representative of actual wheel temperatures. As a result, the method 400 proceeds to 426, where the sensed temperature profile 500 is designated as an atypical wheel profile. At 428, the sensed temperature profile 500 is neglected or otherwise filtered out from an examination of whether the wheel 204 is exhibiting an elevated temperature in order to avoid activating an alarm based on the sensed temperature profile 500. In one embodiment, at 434, a maintenance alert may be generated to notify an operator of the atypical wheel profile. For example, the maintenance alert may be generated and communicated to an operator using the radio 126 (shown in FIG. 1).

On the other hand, if the midpoint temperature attribute does exceed the midpoint temperature threshold, then flow of the method 400 may proceed from 432 to 422-424, where the sensed wheel temperature profile 500 is designated as a typical wheel profile and may be used to determine if the profile 500 indicates an elevated wheel temperature.

Figure 6:
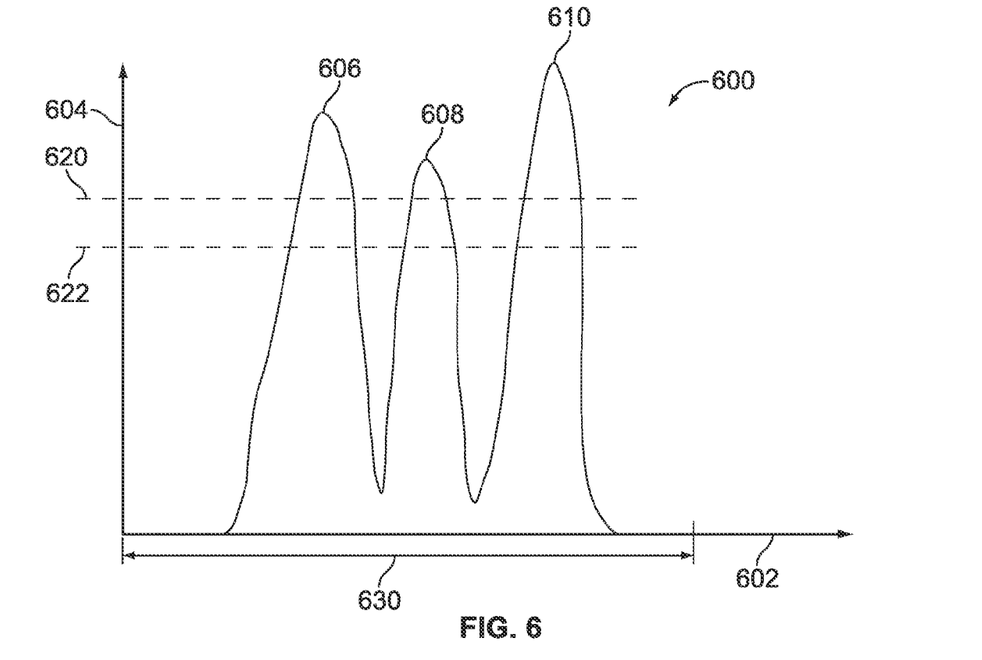
FIG. 6 is another example of a sensed wheel temperature profile.

FIG. 6 illustrates another example of a sensed wheel temperature profile 600. Similar to the sensed wheel temperature profile 500 (shown in FIG. 5), the sensed wheel temperature profile 600 is shown alongside horizontal and vertical axes 602, 604 that are similar to the horizontal and vertical axes 502, 504 (shown in FIG. 5). In contrast to the sensed wheel temperature profile 500, the sensed wheel temperature profile 600 may not be representative of the temperatures of the wheel 204 (shown in FIG. 2) along the sampling plane 306 (shown in FIG. 3) of the wheel 204. Instead, the sensed wheel temperature profile 600 may be representative of noise in the system 100 (shown in FIG. 1), such as microphonic noise. For example, the sensed wheel temperature profile 600 may be representative of noise that is caused by one or more flat portions along the rim 300 (shown in FIG. 3) of the wheel 204 that impart vibration of the wheel temperature scanner 116 (shown in FIG. 1) as the rail vehicle 200 (shown in FIG. 2) makes along the rails 202 (shown in FIG. 2). The vibrations of the scanner 116 may create noise in the signals generated by the scanner 116.

Sensed wheel temperature profiles such as the sensed wheel temperature profile 600 may be filtered by the method 400 shown in FIG. 4, so that the sensed wheel temperature profile 600 is not examined to determine if the wheel temperatures indicate an overheated wheel 204 (shown in FIG. 2) and/or a brake that is stuck in an engaged position. For example, with respect to the method 400, the sensed wheel temperature profile 600 may be obtained and generated at 402-406 as described above. The processor 106 may begin sampling the wheel temperature scanner 116 (shown in FIG. 1) when the wheel gate A or wheel gate B transducer 102, 104 (shown in FIG. 1) indicates that the wheel 204 has entered the inspection window. The sensed wheel temperature profile 600 may include signals representative of the IR radiation that is sensed by the wheel temperature scanner 116 over a predefined and/or configurable sampling period 630, as described above.

At 408, waveform attributes are identified in the sensed wheel temperature profile 600. For example, in one embodiment, at 410, the sensed wheel temperature profile 600 is compared to a rising edge peak threshold 620 that may be similar to the rising edge peak threshold 520 (shown in FIG. 5) and/or a falling edge peak threshold 622 that may be similar to the falling edge peak threshold 556 (shown in FIG. 5). The sensed wheel temperature profile 600 is compared to the rising and/or falling edge peak thresholds 620, 622 to identify waveform peaks 606, 608. 610 in the sensed wheel temperature profile 600. For example, each of the waveform peaks 606-610 may be identified as portions of the sensed wheel temperature profile 600 that increase above the rising edge peak threshold 620 and decrease below the falling edge peak threshold 622 during the sampling period 630, as described above.

At 412, in one embodiment, the number of waveform peaks 606-610 is compared to the predetermined threshold of two. As the number of waveform peaks 606-610 in the sensed wheel temperature profile 600 exceeds the predetermined threshold, the number of waveform peaks 606-610 may indicate that the sensed wheel temperature profile 600 is not representative of temperatures of the wheel 204 (shown in FIG. 2). Instead, the sensed wheel temperature profile 600 may be representative of microphonic noise. As a result, flow of the method 400 continues to 426, where the sensed wheel temperature profile 600 is designated as an atypical wheel profile. An atypical wheel profile may be a temperature profile that is not representative of the temperatures of the wheel 204, but may instead represent noise in the system 100 (shown in FIG. 1), such as microphonic noise, sunshots that are perceived by the wheel temperature scanner 116 (shown in FIG. 1) as IR radiation from the wheel 204, and/or misalignment of the wheel temperature scanner 116.

At 428, the sensed wheel temperature profile 600 is neglected or ignored and is not used by the processor 106 (shown in FIG. 1) to determine if the wheel 204 (shown in FIG. 2) is exhibiting elevated temperatures above an alarm threshold. For example, the processor 106 may filter out and neglect the sensed wheel temperature profile 600 during an examination of temperatures of the wheel 204. Filtering out and neglecting the sensed wheel temperature profile 600 may avoid actuating a false alarm associated with an elevated wheel temperature that is derived from an atypical wheel profile. For example, false alarms may be inhibited by filtering out atypical wheel profiles. As described above, at 434, a maintenance alert may be generated in response to the atypical wheel profile.

Figure 7:
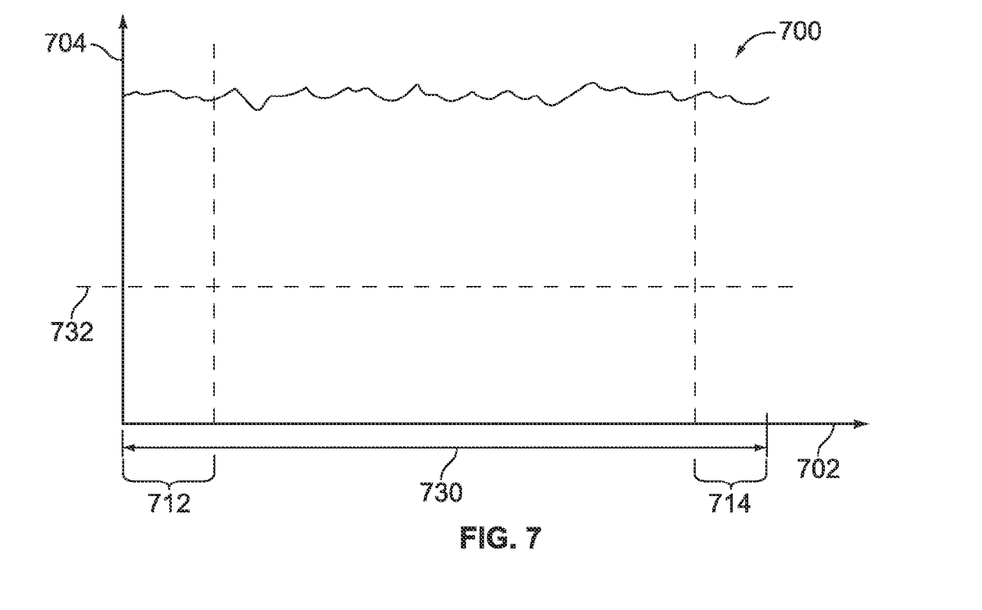
FIG. 7 is another example of a sensed wheel temperature profile.

FIG. 7 illustrates another example of a sensed wheel temperature profile 700. Similar to the sensed-wheel temperature profiles 500, 600 (shown in FIGS. 5 and 6), the sensed wheel temperature profile 700 is shown alongside horizontal and vertical axes 702, 704 that are similar to the horizontal and vertical axes 502, 504 (shown in FIG. 5). In contrast to the sensed wheel temperature profile 500, the sensed wheel temperature profile 700 may not be representative of the temperatures of the wheel 204 (shown in FIG. 2). Instead, the sensed wheel temperature profile 700 may be representative of signals generated by a damaged wheel temperature scanner 116 (shown in FIG. 1) or due to an error by the processor 106 in calculating the sampling rate.

Sensed wheel temperature profiles such as the sensed wheel temperature profile 700 may be filtered by the method 400 (shown in FIG. 4) so that the sensed wheel temperature profile 700 is not examined to determine if the wheel temperatures indicate an overheated wheel 204 (shown in FIG. 2) and/or a brake that is stuck in an engaged position. For example, returning to the discussion of the method 400, the sensed wheel temperature profile 700 may be obtained and generated at 402-406 as described above. The wheel temperature scanner 116 (shown in FIG. 1) may generate signals of the sensed wheel temperature profile 700 over a sampling period 730 that is similar to the sampling period 530 (shown in FIG. 5).

At 408, one or more waveform attributes of the sensed wheel temperature profile 700 are identified. In one embodiment, the sensed wheel temperature profile 700 is examined over the sampling period 730 to determine if the signals obtained by the wheel temperature scanner 116 (shown in FIG. 1) are representative of wheel temperatures within the sampling plane 306 (shown in FIG. 3) of the wheel 204 (shown in FIG. 2). For example, at 414, an initial section 712 and/or a final section 714 of the sensed wheel temperature profile 700 may be compared to a predetermined and/or configurable detection threshold 732 that is similar to the detection threshold 532 (shown in FIG. 5) of the sensed wheel temperature profile 500 (shown in FIG. 5). The initial section 712 may be similar to the initial section 512 (shown in FIG. 5) of the sensed wheel temperature profile 500 and the final section 714 may be similar to the final section 514 (shown in FIG. 5) of the sensed wheel temperature profile 500. For example, the initial section 712 may include a predetermined number of samples of the wheel temperatures that are sensed by the wheel temperature scanner 116 at the beginning of the sampling period 730 while the final section 714 includes a predetermined number of samples obtained at the end of the sampling period 730. The initial and final sections 712, 714 represent the temperatures that are sensed by wheel temperature scanner 116 outside of the sampling plane 306 (shown in FIG. 3) of the wheel 204 (shown in FIG. 2), as described above.

At 416, the signals sampled during the initial and/or final sections 712, 714 are compared to the detection threshold 732. These signals are compared to the detection threshold 732 to determine if the signals exceed the detection threshold 732. If signals in the initial and/or final sections 712, 714 exceed the detection threshold 732. then the signals may indicate that the sensed wheel temperature profile 700 is indicative of noise in the system 100 (shown in FIG. 1) rather than the temperatures of the wheel 204. As described above, the signals in the initial and/or final sections 712, 714 are associated with samples obtained outside of the sampling plane 306 (shown in FIG. 3) of the wheel 204 (shown in FIG. 2), if the signals in the initial and/or final sections 712. 714 exceed the detection threshold 732, then the signals may indicate that the noise in the signals obtained by the wheel temperature scanner 116 are too large and that the sensed wheel temperature profile 700 may not be representative of the temperatures of the wheel 204.

As the signals in both the initial and final sections 712, 714 exceed the detection threshold 732, flow of the method 400 continues to 426 and 428, where the sensed wheel temperature profile 700 is designated as an atypical wheel profile. In contrast, with respect to the sensed wheel temperature profile 500 (shown in FIG. 5), the initial and final sections 512, 514 (shown in FIG. 5) of the profile 500 do not exceed the detection threshold 532 (shown in FIG. 5). Accordingly, flow of the method 400 would continue to 422 and 424 for the sensed wheel temperature profile 500, where the sensed wheel temperature profile 500 is designated as a typical wheel profile.

As described above, at 434, a maintenance alert may be generated in response to the atypical wheel profile.

Figure 8:
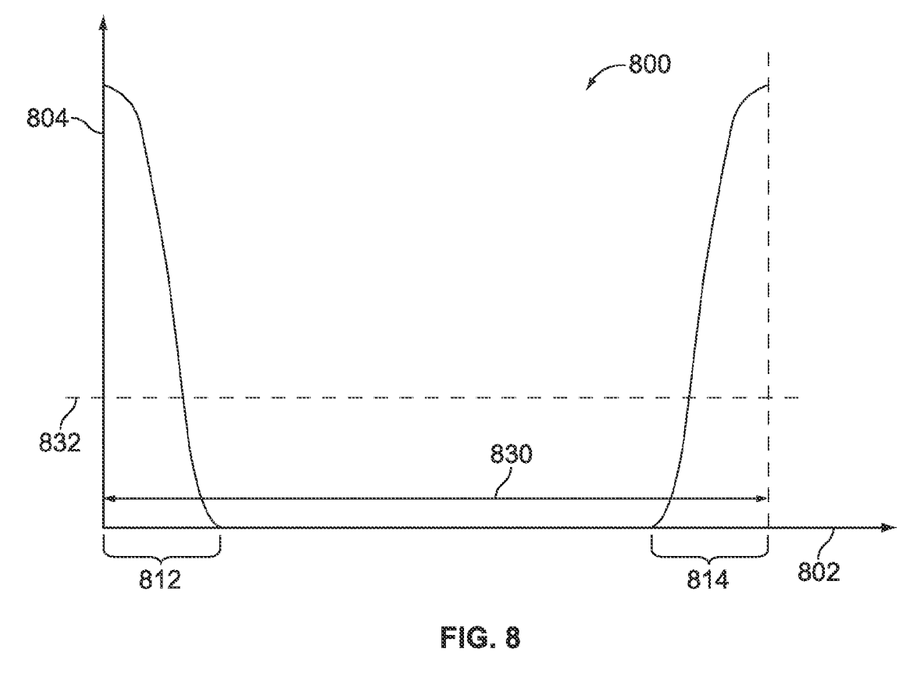
FIG. 8 is another example of a sensed wheel temperature profile.

FIG. 8 illustrates another example of a sensed wheel temperature profile 800. Similar to the sensed wheel temperature profiles 500 through 700 (shown in FIGS. 5 through 7), the sensed wheel temperature profile 800 is shown alongside horizontal and vertical axes 802, 804 that are similar to the horizontal and vertical axes 502, 504 (shown in FIG. 5). In contrast to the sensed wheel temperature profile 500, the sensed wheel temperature profile 800 may not be representative of the temperatures of the wheel 204 (shown in FIG. 2). Instead, the sensed wheel temperature profile 800 may be representative of temperatures sensed by the wheel temperature scanner 116 (shown in FIG. 1) outside of the wheel 204. For example, a miswired or malfunctioning wheel gate A or wheel gate B transducer 102, 104 (shown in FIG. 1) may incorrectly indicate when the wheel 204 enters the inspection window. The wheel gate A or wheel gate B transducer 102, 104 may indicate that the wheel 204 is entering the inspection window when the wheel 204 already is present in the inspection window or is exiting the inspection window. As a result, the temperatures that are sensed by the wheel temperature scanner 116 may be representative of ambient conditions or objects other than the wheel 204.

Sensed wheel temperature profiles such as the sensed wheel temperature profile 800 may be filtered by the method 400 shown in FIG. 4 so that the sensed wheel temperature profile 800 is not examined to determine if the wheel temperatures indicate an overheated wheel 204 (shown in FIG. 2) and/or a brake that is stuck in an engaged position. For example, instead of, or in addition to, identifying waveform peaks of sensed wheel temperature profiles as described above, the method 400 may examine the magnitude of signals that appear to be representative of temperatures sensed outside of the wheel 204. In one embodiment, the sensed wheel temperature profile 800 may be obtained and generated at 402406 as described above. The wheel temperature scanner 116 (shown in FIG. 1) may generate signals of the sensed wheel temperature profile 800 over a sampling period 830 that is similar to the sampling period 530 (shown in FIG. 5). At least one difference between the sampling periods 530, 830 is that the sampling period 830 may begin on an incorrect indication that the wheel 204 is entering the inspection window.

At 408, one or more waveform attributes of the sensed wheel temperature profile 800 are identified. As described above, in one embodiment, the sensed wheel temperature profile 800 may be examined over the sampling period 830 to determine if the signals correspond to temperatures obtained along the sampling plane 306 (shown in FIG. 3) of the wheel 204 (shown in FIG. 2). At 414, an initial section 812 and/or a final section 814 of the sensed wheel temperature profile 800 may be compared to a predetermined and/or configurable detection threshold 832. The initial section 812., the final section 814, and/or the detection threshold 832 may he similar to the corresponding initial section 512 (shown in FIG. 5), final selection 514 (shown in FIG. 5) and detection threshold. 532 (shown in FIG. 5) of the sensed wheel temperature profile 500 (shown in FIG. 5).

At 416, the signals in the initial and/or final sections 812, 814 are compared to the detection threshold 832 to determine if the signals obtained during the initial and/or final sections 812, 814 exceed the detection threshold 832. If signals in the initial and/or final sections 812, 814 exceed the detection threshold 832, then the signals may indicate that the sensed wheel temperature profile 800 is not representative of the temperatures of the wheel 204 (shown in FIG. 2). For example, if the initial and/or final sections 812, 814 have signals, that exceed the detection threshold 832, then the signals in these sections 812, 814 may indicate that the sampling period 830 is misaligned with the movement of the wheel 204 past the wheel temperature scanner 116 (shown in FIG. 1) and/or the sensing path 208 (shown in FIG. 2). By way of example only, if the wheel gate A or B transducer 102, 104 incorrectly indicates when the wheel 204 enters the inspection window, the sampling period 830 may begin within the rim region 310 (shown in FIG. 3) of the sampling plane 306 of a first wheel 204 and end with the rim region 308 (shown in FIG. 3) of the sampling plane 306 of a second, subsequent wheel 204.

In a sensed wheel temperature profile that is based on a correct indication of when the wheel 204 (shown in FIG. 2) enters the inspection window, the signals in the initial and/or final sections 812, 814 may be less than the detection threshold 832, as these signals may be based on temperatures that are obtained outside of the wheel 204 and may reflect cooler temperatures than the temperatures of the wheel 204. For example, the signals in the initial and final sections 512, 514 (shown in Figure 5) of the sensed wheel temperature profile 500 (shown in FIG. 5) do not exceed the detection threshold 532 (shown in FIG. 5) and thus may indicate or confirm that the sensed wheel temperature profile 500 represents temperatures of the wheel 204. As the signals in the initial and final sections 812, 814 of the sensed wheel temperature profile 800 exceed the detection threshold 832, flow of the method 400 continues to 426 and 428, where the sensed wheel temperature profile 800 is classified as an atypical wheel profile.

In addition to, or instead of, identifying waveform peaks and/or examining signals representative of temperatures that may be outside of the wheel 204 (shown in FIG. 2), the method 400 may filter sensed wheel temperature profiles based on a wheel chord width that is derived from the sensed wheel temperature profile. For example, the waveform attribute that is identified at 408 may be the size of length of a chord dimension extending across the wheel 204 (shown in FIG. 2). The wheel chord width may be an approximation of the distance across the wheel 204 (shown in FIG. 2) through which the sensing path 306 (shown in FIG. 3) passes.

In one embodiment, the wheel chord width is derived by determining the distance that is spanned by the portion of the sensed wheel temperature profile that extends above a detection threshold. For example, with respect to the sensed wheel temperature profile 500 shown in FIG. 5, a wheel chord width 534 may be defined as the distance between points 536, 538 that the sensed wheel temperature profile 500 exceeds the detection threshold 532. As described above, the wheel temperature scanner 116 (shown in FIG. 1) may obtain temperature samples at a sampling rate that provides a temperature sample for each unit of distance along the rail 202 (shown in FIG. 2). By way of example only, the wheel temperature scanner 116 may obtain temperature readings for each inch along the sampling plane 306 (shown in FIG. 3) of the wheel 204 (shown in FIG. 2) as the wheel 204 moves past the wheel temperature scanner 116. The wheel chord width 534 may be derived by determining the number of samples extending between and/or inclusive of the points 536, 538 and calculating the distance between the points 536, 538 that is represented by the profile 500. For example, if a temperature sample is obtained once for every inch along the sampling plane 306 and there are fourteen samples between and inclusive of the points 536, 538, then the wheel chord width 534 may be approximately fourteen inches.

At 420, the wheel chord width is compared to one or more predetermined and/or configurable wheel width thresholds.

By way of example only, a wheel width threshold may be a known width of the distance across which the sampling plane 306 passes across the wheel 204 (shown in FIG. 2) of the rail vehicle 200 (shown in FIG. 2). If the wheel chord width is less than the wheel width threshold, then the wheel chord width may indicate that the sensed wheel temperature profile does not represent the temperatures of the wheel 204. For example, the wheel chord width 534 may approximately represent the distance along the sampling plane 306 between the outer surfaces of the rim 300 (shown in FIG. 3) of the wheel 204. If the wheel chord width 534 is smaller than the actual distance across the wheel 204 that is spanned by the sampling plane 306, then the wheel chord width 534 and the sensed wheel temperature profile 500 may not be accurate representations of the temperatures of the wheel 204. Alternatively, the wheel chord width may be compared to a predetermined minimum wheel width threshold and/or a maximum wheel width threshold. If the wheel chord width is smaller than the minimum wheel width threshold or is greater than the maximum wheel width threshold, then the wheel chord width may indicate that the sensed wheel temperature profile does not represent the temperatures of the wheel 204.

If the wheel chord width indicates that the sensed wheel temperature profile is not indicative of the temperatures of the wheel 204, then flow of the method 400 may continue to 426 and 428, where the sensed wheel temperature profile is designated as an atypical wheel profile. As described above, at 434, a maintenance alert may be generated in response to the atypical wheel profile. Alternatively, if the wheel chord width is at least as large as the wheel width threshold, then the corresponding sensed wheel temperature profile may be representative of the temperatures of the wheel 204. Consequently, flow of the method 400 may continue to 422 and 424, where the sensed wheel temperature profile is classified as a typical wheel profile.

Another embodiment relates to a method for inspecting a rail vehicle. The method comprises generating a sensed wheel temperature profile of a wheel of the rail vehicle. The sensed wheel temperature profile comprises a plurality of respective temperatures of the wheel sensed at different locations of the wheel as the wheel passes a sensor during movement of the rail vehicle. The method further comprises identifying waveform peaks within the sensed wheel temperature profile. The waveform peaks are identified when the temperatures in the sensed wheel temperature profile increase above a rising edge peak threshold then decrease below a falling edge peak threshold. The method further comprises designating the sensed wheel temperature profile as a typical wheel profile if the waveform peaks meet at least one designated criterion and as an atypical wheel profile if the waveform peaks fail to meet the at least one designated criterion. For example, the at least one criterion may comprise a designated relationship between a midpoint temperature in the profile (identified between the waveform peaks) and a predetermined temperature threshold. (The designated relationship may be, for example, the midpoint temperature being above the predetermined temperature threshold, that is, the waveform peaks meet the designated criterion if the midpoint temperature is above the predetermined threshold.) As discussed above, "midpoint" refers to a temperature between the peaks and not necessarily exactly in the middle between the peaks. The at least one criterion may include a width of the wheel as derived from the sensed wheel temperature profile and as described above and/or the magnitude or level of signals in the sensed wheel temperature profile that are obtained outside of, or before and/or after, the wheel, as described above.

In another embodiment, the at least one criterion comprises the sensed wheel temperature profile having two waveform peaks that rise above a rising edge peak threshold and subsequently fall below a falling edge peak threshold. Thus, the sensed wheel temperature profile is designated as typical if the identified waveform peaks comprise two waveform peaks that rise above a rising edge peak threshold and subsequently fall below a falling edge peak threshold; the sensed wheel temperature profile is designated as atypical if the identified waveform peaks comprise two peaks that do not rise above the rising edge peak threshold and subsequently fall below the falling edge peak threshold, or, in one embodiment, if the identified waveform peaks comprise more than two peaks.

In another embodiment, the at least one criterion comprises two criteria, namely, a midpoint temperature determination (as discussed above) and whether the profile exhibits two waveform peaks that rise above a rising edge peak threshold and subsequently fall below a falling edge peak threshold. In one embodiment, the second criterion is that the profile exhibits two, but no more than two, waveform peaks that rise above a rising edge peak threshold and subsequently fall below a falling edge peak threshold.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S. C. §112, sixth paragraph, unless and until such claim limitations expressly use the phrase "means for" followed by a statement of function void of further structure. Further, the phrase "at least one of 'A' and 'B'" means "A and/or B."

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for inspecting a rail vehicle, the method comprising:
    receiving, at a processor, signals representative of temperatures of a wheel of the rail vehicle;
    generating, by the processor based on the received signals, a sensed wheel temperature profile of the wheel based on the signals, at least a portion of the sensed wheel temperature profile being representative of the temperatures of the wheel;
filtering the signals representative of temperatures based on the sensed wheel temperature profile not exceeding a detection threshold;
identifying waveform attributes in the portion of the sensed wheel temperature profile representative of the temperatures of the wheel; and
designating the sensed wheel temperature profile as at least one of a typical wheel profile and an atypical wheel profile based on the waveform attributes in the sensed wheel temperature profile.

2. The computer-implemented method of claim 1, further comprising analyzing the sensed wheel temperature profile to determine whether the wheel exhibits an elevated temperature when the sensed wheel temperature profile is designated as the typical wheel profile.

3. The computer-implemented method of claim 1, further comprising filtering the sensed wheel temperature profile to inhibit activation of an alarm associated with an elevated wheel temperature when the sensed wheel temperature profile is designated as the atypical wheel profile.

4. The computer-implemented method of claim 1, wherein the designating operation comprises classifying the sensed wheel temperature profile as the atypical wheel profile when a number of the waveform attributes exceeds a predetermined threshold.

5. The computer-implemented method of claim 1, wherein the identifying operation comprises identifying waveform peaks within the sensed wheel temperature profile, where the waveform peaks are identified when the signals in the sensed wheel temperature profile increase above a rising edge peak threshold then decrease below a falling edge peak threshold.

6. The computer-implemented method of claim 1, wherein the identifying operation comprises identifying waveform peaks in the sensed wheel temperature profile and a midpoint temperature between the waveform peaks, the midpoint temperature compared to a predetermined temperature threshold to determine if the sensed wheel temperature profile is the atypical wheel profile.

7. The computer-implemented method of claim 1, wherein the designating operation comprises designating the sensed wheel temperature profile as the atypical wheel profile when signals representative of temperatures of the wheel obtained outside of the wheel exceed the detection threshold.

8. The computer-implemented method of claim 1, further comprising identifying a distance, between waveform peaks in the sensed wheel temperature profile to approximate a wheel chord width, wherein the designating operation comprises classifying the sensed wheel temperature profile as the atypical wheel profile when the wheel chord width is less than a predetermined minimum threshold or greater than a maximum threshold.

9. The computer-implemented method of claim 1, wherein the designating operation comprises designating the sensed wheel temperature profile as a typical wheel profile when the sensed wheel temperature profile comprises two waveform peaks that rise above a rising edge peak threshold and subsequently fall below a falling edge peak threshold.

10. A rail vehicle inspection system comprising:
a temperature sensor for sensing temperatures of a wheel of a rail vehicle, the temperature sensor generating signals representative of the temperatures; and
a processor to receive the signals from the temperature sensor, the processor programmed to:
generate a sensed wheel temperature profile, at least a portion of the sensed wheel temperature profile being based on a portion of the signals that are representative of the temperatures of the wheel,
filter the signals representative of temperatures based on the sensed wheel temperature profile not exceeding a detection threshold,
identify waveform attributes in the portion of the sensed wheel temperature profile representative of the temperatures of the wheel, and
designate the sensed wheel temperature profile as at least one of an atypical wheel profile and a typical wheel profile based on the waveform attributes.

11. The system of claim 10, wherein the processor is programmed to, if the sensed temperature profile is designated as the typical wheel profile, analyze the sensed wheel temperature profile to determine whether the wheel exhibits an elevated temperature and, if the sensed temperature profile is designated as the atypical wheel profile, filter the sensed wheel temperature profile to inhibit activation of an alarm associated with the elevated temperature.

12. The system of claim 10, wherein the processor is programmed to classify the sensed wheel temperature profile as the atypical wheel profile when a number of the waveform attributes exceeds a predetermined threshold.

13. The system of claim 10, wherein the processor is programmed to identify waveform peaks within the sensed wheel temperature profile, the waveform peaks identified when the signals in the sensed wheel temperature profile increase above a rising edge peak threshold then decrease below a falling edge peak threshold.

14. The system of claim 10, wherein the processor is programmed to identify waveform peaks in the sensed wheel temperature profile and a midpoint temperature between the waveform peaks, the processor further programmed to compare the midpoint temperature to a predetermined temperature threshold to determine if the sensed wheel temperature profile is the atypical wheel profile.

15. A non-transitory computer readable storage medium for a rail inspection system having a processor and a temperature sensor configured to sense temperatures of a wheel of a rail vehicle and to generate signals representative of the temperatures, the computer readable storage medium comprising instructions stored therein for causing the processor to:
receive the signals from the temperature sensor;
generate a sensed wheel temperature profile based on the signals, at least a portion of the sensed wheel temperature profile representative of the temperatures of the wheel;
filter the signals representative of temperatures based on the sensed wheel temperature profile not exceeding a detection threshold;
identify waveform attributes in the portion of the sensed wheel temperature profile representative of the temperatures of the wheel; and
designate the sensed wheel temperature profile as at least one of a typical wheel profile and an atypical wheel profile based on the waveform attributes.

16. The non-transitory computer readable storage medium of claim 15, wherein the instructions direct the processor to:
if the sensed wheel temperature profile is designated as the typical wheel profile, analyze the sensed wheel temperature profile to determine whether the wheel exhibits an elevated temperature; and
if the sensed wheel temperature profile is designated as the atypical wheel profile, filter the sensed wheel temperature profile to inhibit activation of an alarm associated with the elevated wheel temperature.

17. The non-transitory computer readable storage medium of claim 15, wherein the instructions direct the processor to:
- identify waveform peaks in the sensed wheel temperature profile and a midpoint temperature between the waveform peaks; and
- compare the midpoint temperature to a predetermined temperature threshold to determine if the sensed wheel temperature profile is the atypical wheel profile.

18. The non-transitory computer readable storage medium of claim 15, wherein the instructions direct the processor to designate the sensed wheel temperature profile as the atypical wheel profile when signals representative of temperatures of the wheel obtained outside of the wheel exceed the detection threshold.

19. The non-transitory computer readable storage medium of claim 15, wherein the instructions direct the processor to:
- identify a distance between waveform peaks in the sensed wheel temperature profile; and
- classify the sensed wheel temperature profile as the atypical wheel profile when the distance is less than a predetermined minimum threshold or greater than a maximum threshold.

20. The non-transitory computer readable storage medium of claim 15, wherein the instructions direct the processor to designate the sensed wheel temperature profile as a typical wheel profile when the sensed wheel temperature profile comprises two waveform peaks extending above a peak threshold.

21. A computer-implemented method for inspecting a rail vehicle, the method comprising:
- generating, by a processor, a sensed wheel temperature profile of a wheel of the rail vehicle, wherein the sensed wheel temperature profile comprises a plurality of respective temperatures of the wheel sensed at different locations of the wheel as the wheel passes a sensor during movement of the rail vehicle;
- filtering, by a processor, the signals representative of temperatures based on the sensed wheel temperature profile not exceeding a detection threshold;
- identifying, by a processor, waveform peaks within at least a portion of the sensed wheel temperature profile comprising the plurality of respective temperatures of the wheel, wherein the waveform peaks are identified when the temperatures in the sensed wheel temperature profile increase above a rising edge peak threshold then decrease below a falling edge peak threshold; and
- designating the sensed wheel temperature profile as a typical wheel profile if the waveform peaks meet at least one designated criterion and as an atypical wheel profile if the waveform peaks fail to meet the at least one designated criterion.

22. The computer-implemented method of claim 21, further comprising identifying a midpoint temperature between the waveform peaks, wherein the at least one criterion comprises a designated relationship between the midpoint temperature and a predetermined temperature threshold.

23. The computer-implemented method of claim 21, wherein the at least one criterion comprises the sensed wheel temperature profile having two waveform peaks that rise above the rising edge peak threshold and subsequently fall below the falling edge peak threshold.

* * * * *